United States Patent
Choi et al.

(10) Patent No.: US 12,394,328 B2
(45) Date of Patent: Aug. 19, 2025

(54) PRE-TRAINING MODELING SYSTEM AND METHOD FOR PREDICTING EDUCATIONAL ELEMENT

(71) Applicant: RIIID INC., Seoul (KR)

(72) Inventors: Young Duck Choi, Seoul (KR); Young Nam Lee, Seoul (KR); Jung Hyun Cho, Seoul (KR); Jin Eon Baek, Seoul (KR); Dong Min Shin, Seoul (KR); See Woo Lee, Chungju-si (KR); Yeong Min Cha, Seongnam-si (KR); Byung Soo Kim, Seoul (KR); Jae We Heo, Seoul (KR)

(73) Assignee: RIIID INC., Seoul (KR)

( * ) Notice: Subject to any disclaimer, the term of this patent is extended or adjusted under 35 U.S.C. 154(b) by 0 days.

(21) Appl. No.: 17/800,730

(22) PCT Filed: May 24, 2021

(86) PCT No.: PCT/KR2021/006427
§ 371 (c)(1),
(2) Date: Dec. 1, 2022

(87) PCT Pub. No.: WO2022/250171
PCT Pub. Date: Dec. 1, 2022

(65) Prior Publication Data
US 2024/0221523 A1 Jul. 4, 2024

(51) Int. Cl.
*G09B 7/00* (2006.01)
*G06N 20/00* (2019.01)

(52) U.S. Cl.
CPC ............. *G09B 7/00* (2013.01); *G06N 20/00* (2019.01)

(58) Field of Classification Search
CPC ............ G09B 7/00; G09B 5/00; G06N 20/00
See application file for complete search history.

(56) References Cited

U.S. PATENT DOCUMENTS

| 2019/0333400 A1 | 10/2019 | Saini et al. |
| 2020/0202226 A1 | 6/2020 | Nagatani et al. |
| 2022/0083902 A1* | 3/2022 | Okolo ............... G06N 5/04 |

FOREIGN PATENT DOCUMENTS

| KR | 10-2015-0110449 A | 10/2015 |
| KR | 10-2019-0105252 A | 9/2019 |

(Continued)

*Primary Examiner* — Timothy A Musselman
(74) *Attorney, Agent, or Firm* — Sughrue Mion, PLLC (57) ABSTRACT

According to an embodiment of the present disclosure, a pre-training modeling system for predicting an educational element using a pre-trained AI model includes: a pre-training unit configured to pre-train an AI model, through an evaluation element that can be automatically collected every time a user solves an individual question by receiving an interaction element according to an offline user's operation from a user terminal, classifying an AI element of educational content into the interaction element and the educational element, and intersecting the interaction element and the educational element; a fine-tuning unit configured to perform an additional training operation with respect to the pre-trained AI model, according to an educational element to be predicted; and an educational element prediction unit configured to predict, on the basis of the fine-tuned AI model, one or more pieces of information among test scores, grades, qualifications, and review information indicating whether the user got a correct answer when re-solving the same question, which are information that must be separately input from the user because the amount of information automatically collected every time the user solves an individual question is small or cannot be automatically collected.

6 Claims, 5 Drawing Sheets

(56) References Cited

FOREIGN PATENT DOCUMENTS

| KR | 10-2019-0125056 A | 11/2019 |
| KR | 10-2021-0105272 A | 8/2021 |

* cited by examiner

PRE-TRAINING MODELING SYSTEM AND METHOD FOR PREDICTING EDUCATIONAL ELEMENT

CROSS-REFERENCE TO RELATED APPLICATION

This application is a National Stage of International Application No. PCT/KR2021/006427 filed May 24, 2021.

TECHNICAL FIELD

The present disclosure relates to a pre-training modeling system and method for predicting an educational element using a pre-trained artificial intelligence (AI) model. Specifically, the present disclosure relates to a pre-training modeling system and method that pre-trains an AI model with respect to data related to user's question-solving and fine-tunes the pre-trained AI model according to an educational element to be predicted, thereby having more improved accuracy.

BACKGROUND ART

Recently, as the use of the Internet and electronic devices has been actively increased in each field, the educational environment is also changing rapidly. In particular, with the development of various educational media, learners can choose and use a wider range of training methods. Among them, the education service through the Internet has become a major teaching and training method because of the advantage of overcoming time and space constraints and enabling low-cost education.

This online education service may combine with artificial intelligence (AI) of various models to predict the probability of a user's correct answer to a random question which was not possible in the existing offline education environment, thereby providing more effective training contents.

However, unlike the probability of correct answers, which can be predicted directly from the question-solving data that AI models can collect, in terms of test scores or grades, there is not enough actual test score data to directly predict the test scores or grades, and even the actual test score data can only be collected in small amounts offline, so there was a problem in that the accuracy was lower compared to the prediction of the probability of a correct answer.

In addition, a dropout rate, which is the probability that the user will end training in the middle of online training or review information on whether the user got a correct answer when the user re-solved a question that was wrong before is also automatically collected by the AI model. However, there was a problem in that the amount of collected data was insufficient or the data existed sporadically, so that it was impossible to predict with high accuracy through an AI model trained with these data.

DISCLOSURE

Technical Problem

Therefore, the present disclosure has been made in view of the above-mentioned problems, and the present disclosure provides a pre-training modeling system and method that defines an evaluation element as an element that can be used as a tool for pedagogical evaluation among information generated through interaction between a user and an AI model in educational content, and trains the AI model using the defined evaluation element, thereby increasing the accuracy with reduced noise by removing unnecessary training data.

Also, the present disclosure provides a pre-training modeling system and method that can solve a question in which an educational element cannot be accurately predicted due to the lack of training data, through an AI model that is pre-trained using an evaluation element and then fine-tuned according to an educational element to be predicted.

Technical Solution

In accordance with an aspect of the present disclosure, a pre-training modeling system for predicting an educational element using a pre-trained AI model may include: a pre-training unit configured to pre-train an AI model, through an evaluation element that can be automatically collected every time a user solves an individual question by receiving an interaction element according to an offline user's operation from a user terminal, classifying an AI element of educational content into the interaction element and the educational element, and intersecting the interaction element and the educational element: a fine-tuning unit configured to perform an additional training operation with respect to the pre-trained AI model, according to an educational element to be predicted: and an educational element prediction unit configured to predict, on the basis of the fine-tuned AI model, one or more pieces of information among test scores, grades, eligibility, and review information indicating whether the user got a correct answer when re-solving the same question, which the amount of information automatically collected every time the user solves an individual question is small or information that must be separately input from the user because the information cannot be automatically collected. The pre-training modeling system may pre-train the AI model with respect to data related to question-solving of the user and may fine-tune the pre-trained AI model according to the educational element to be predicted, thereby having improved accuracy.

In accordance with another aspect of the present disclosure, a pre-training modeling method for predicting an educational element using a pre-trained AI model may include: pre-training an AI model through an evaluation element that can be used as a tool for pedagogical evaluation from an interaction element by receiving the interaction element according to an offline user's operation from a user terminal: fine-tuning the pre-trained AI model by performing an additional training operation with respect to the pre-trained AI model according to an educational element to be predicted; and predicting the educational element on the basis of the fine-tuned AI model. The pre-training modeling method may pre-train the AI model with respect to data related to question-solving of the user and may fine-tune the pre-trained AI model according to the educational element to be predicted, thereby having improved accuracy.

Advantageous Effects

According to a pre-training modeling system and method according to an embodiment of the present disclosure, by defining an evaluation element as an element that can be used as a tool for pedagogical evaluation among information generated through interaction between a user and an AI model in educational content and training the AI model using the defined evaluation element, the accuracy thereof can be increased with reduced noise by removing unnecessary training data.

According to a pre-training modeling system and method according to an embodiment of the present disclosure, it is possible to solve a question in which an educational element cannot be accurately predicted due to the lack of training data, through an AI model that is pre-trained using an evaluation element and then fine-tuned according to an educational element to be predicted.

MODE FOR INVENTION

The above-described objects, features and advantages will be described below in detail with reference to the accompanying drawings, and accordingly, those skilled in the art to which the present disclosure pertains will be able to easily implement the technical idea of the present disclosure. In describing the present disclosure, if it is determined that a detailed description of a known technology related to the present disclosure may unnecessarily obscure the gist of the present disclosure, the detailed description will be omitted.

In the drawings, the same reference numerals are used to refer to the same or similar elements, and all combinations described in the specification and claims may be combined in any manner. Unless otherwise specified, it is to be understood that a singular expression may include one or more, and also includes a plural expression.

The terminology used herein is for the purpose of describing specific exemplary embodiments only and is not intended to be limiting. As used herein, singular expressions may also be intended to include plural meanings unless the sentence clearly indicates otherwise. The term "and/or" includes any and all combinations of the items listed therewith. The terms "comprises," "comprising," "consists of," "including," "have" and "having" are inclusive, and therefore specify the presence of said features, integers, steps, operations, elements, and/or components, but do not exclude the presence or addition of one or more multiple other features, integers, steps, operations, elements, components, and/or groups thereof. The method steps, processes, and operations described herein are not to be understood as necessarily requiring implementation thereof in the particular order illustrated or illustrated, unless specifically designated as an order of performance. It is also understood that additional or alternative steps may be used.

In addition, each of the components may be implemented as a hardware processor, the above components may be integrated into one hardware processor, or the above components may be combined with each other and implemented as a plurality of hardware processors.

Figure 1:
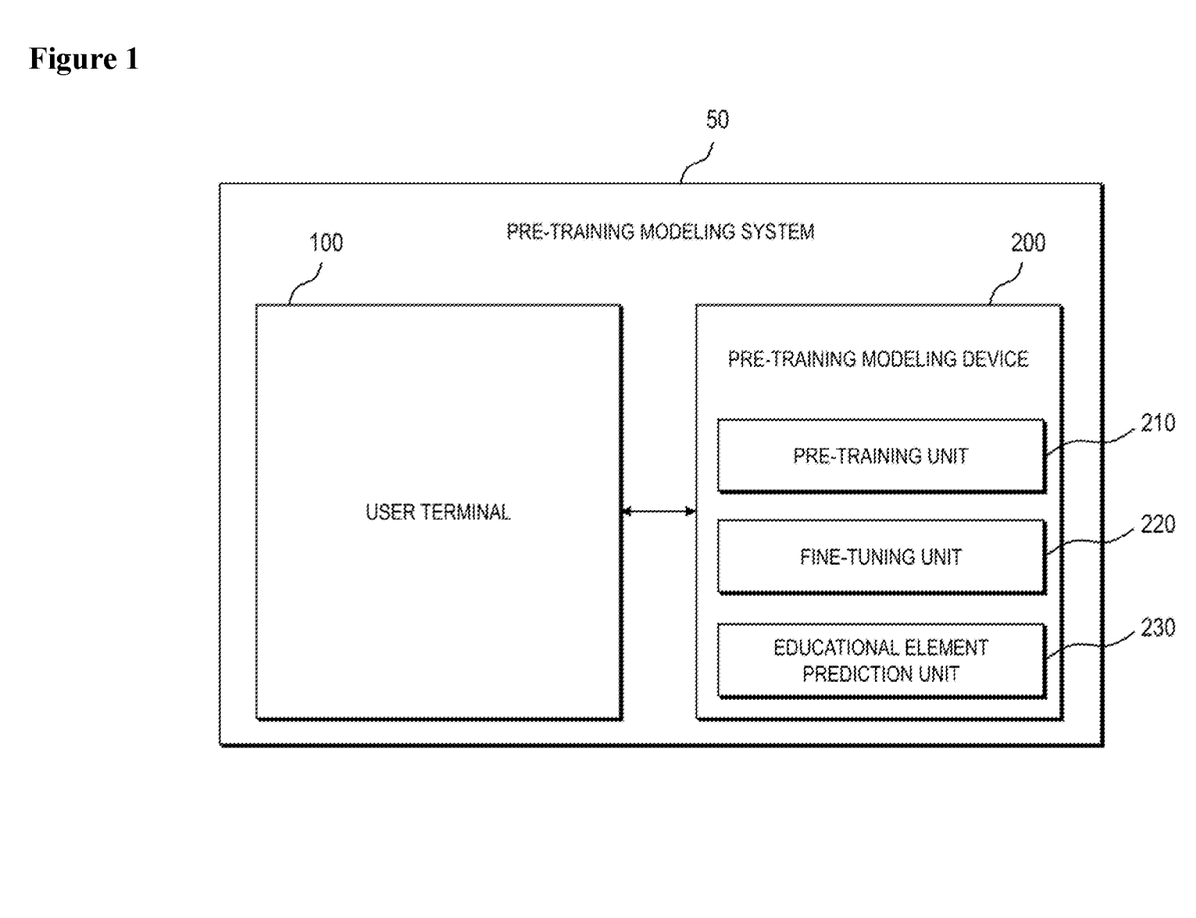
FIG. 1 is a diagram illustrating a pre-training modeling system according to an embodiment of the present disclosure.

FIG. 1 is a diagram illustrating a pre-training modeling system according to an embodiment of the present disclosure.

Referring to FIG. 1, a pre-training modeling system 50 according to an embodiment of the present disclosure may include a user terminal 100 and a service server 200.

The user terminal 100 may provide a question to a user, and may receive a question-solving result of the user to provide the received result to the service server 200. The user terminal 100 may be implemented as a smart phone, a tablet PC, or the like.

The pre-training modeling device 200 may receive the question-solving result from the user terminal 100, may train an artificial intelligence (AI) model on the basis of the received result, and may predict various educational elements as a means for providing user-personalized educational content.

The conventional AI model collects the user's question-solving results to predict the probability of correct and incorrect answers and indirectly predicts the user's test score on the basis of the predicted results. When a user solves a question, the correct or incorrect answer to the question is automatically recorded, so that the probability of a user's correct/incorrect answer to an individual question can be predicted only from the question-solving result.

However, because information such as test scores, grades, qualifications, and review information is not automatically recorded every time a user solves a question, or the amount of the collected information is small, there is a limitation in that there is no choice but to predict indirectly the information through the question-solving result.

Specifically, for the test score, the actual test score received by the user must be input offline, and the corresponding data is insufficient compared to the number of questions solved. The review information, which is information on whether the user got a correct answer when re-solving the same question, cannot be collected in a short period of time and the solving result for the same question has to be received again after a certain period of time, so that there is a limitation in the amount of data that can be collected.

The pre-training modeling system 50 according to an embodiment of the present disclosure may pre-train an AI model with respect to a user's question-solving data and may fine-tune the pre-trained AI model according to an educational element to be predicted, thereby predicting the educational element with more improved accuracy.

In the pre-training, at least one evaluation element may be used as training data. The evaluation element may be an element that can be used as a tool for pedagogical evaluation among information generated through interaction between a user and an AI model in educational content. The evaluation element may be described with reference to FIG. 2.

Figure 2:
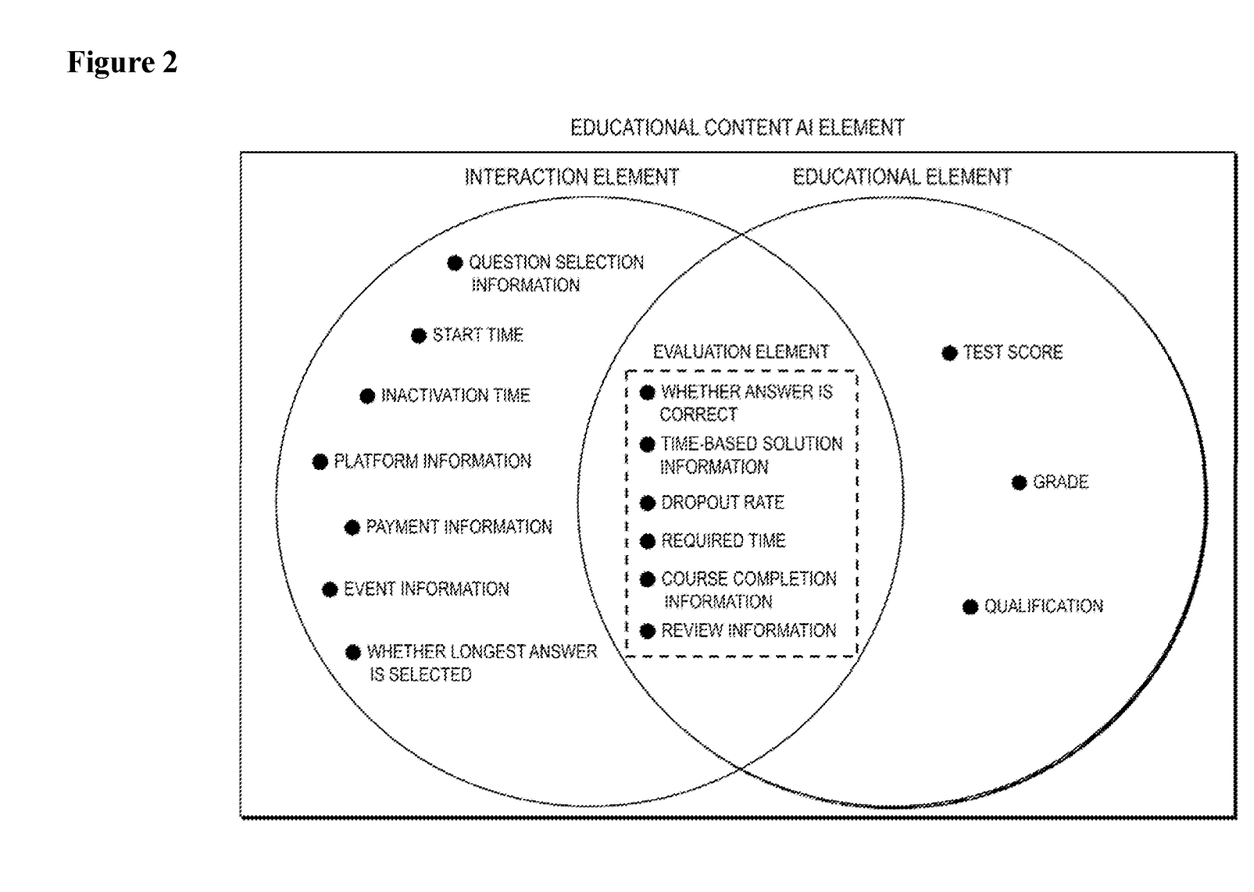
FIG. 2 is a diagram illustrating an interaction element, an educational element, and an evaluation element according to an embodiment of the present disclosure.

FIG. 2 is a diagram illustrating an interaction element, an educational element, and an evaluation element according to an embodiment of the present disclosure.

Referring to FIG. 2, an educational content-AI element may include an interaction element, an educational element, and an evaluation element.

The interaction element may be information collected according to interaction between an AI model and a user, and may be information collected in the AI model according to the operation of an offline user. The interaction element may include question selection information, start time, inactivation time, platform information, payment information, event information, whether the longest answer is selected, whether the answer is correct, time-based solution information, a dropout rate, a required time, course completion information, and review information. However, the interaction element is not limited thereto, and may include all information that the AI model can collect according to an offline user's action.

The educational element may be information related to training, and may include a question solved by a user, a question-solving result, or information collected during a solution process. For example, the educational element may include test scores, grades, qualifications, whether the answer is correct, time-based solution information, a dropout rate, a required time, course completion information, and review information.

The evaluation element may be information that can be used as a tool for pedagogical evaluation among information generated through interaction between a user and an AI model in educational content. The evaluation element can be understood as the intersection of the interaction element and the educational element. In an embodiment, the evaluation element may include whether the answer is correct, time-based solution information, a dropout rate, a required time, course completion information, and review information, but is not limited thereto.

The question selection information may be information on whether the user has solved a question provided by the AI model. The start time may be information on time when the user started solving the corresponding question. The inactivation time may be information on a period in which the user did not operate during training. The platform information may be information on an online training environment such as where the user has trained from a web or an app. The payment information may be information on whether the user has purchased paid content. The event information may be information on whether the user has moved to an application event during training. Whether the longest answer is selected may be information on whether the user has selected text with the longest description.

Whether the answer is correct may be information on whether the user has answered a given question. The time-based solution information may be information on whether the question-solving has been completed within a limited time. The dropout rate may be information on whether the user has completed training during training. The required time may be information on a time required for a user to solve a given question. The course completion information may be information on whether the user has completed the course to the end. The review information may be information on whether the user got a correct answer when re-solving a previously solved question.

The test scores may be information on the score received in an actual test according to the type of question (TOEIC, TOEFL, TEPS, SAT, College Scholastic Ability Test, . . . ). The grades may be information on the level of training evaluated according to the above-described question type. The qualifications may be information on whether the user has obtained the qualification in a test in which qualification is determined according to a reference score.

Referring again to FIG. 1, the pre-training modeling device 200 according to an embodiment of the present disclosure may include a pre-training unit 210, a fine-tuning unit 220, and an educational element prediction unit 230.

The pre-training unit 210 may receive an interaction element according to an offline user's operation from the user terminal 100 and may perform pre-training.

Specifically, the pre-training unit 210 may perform pre-training of the AI model after determining an evaluation element that is training data for pre-training the AI model, according to an educational element to be predicted among the interaction elements. The training data to be used for pre-training may be a training evaluation element.

Which of the interaction elements will be determined as the evaluation element may be determined differently depending on the educational element to be predicted, and which of the evaluation elements will be determined as the training evaluation element to be used for pre-education may also be determined differently depending on the educational element to be predicted.

In an embodiment, the training evaluation element may be determined according to a result of comparing the result of predicting the educational element and the actual value by combining one or more evaluation elements. For example, a combination of evaluation elements showing the highest accuracy as the result of comparison may be determined as the training evaluation element.

Referring to FIG. 1, the pre-training unit 210 may determine the training evaluation element and may then perform pre-training. The pre-training may be an operation of training the AI model with relevant training data or noise in order to match the training amount required for prediction when the amount of training data to be predicted is insufficient.

A case in which "whether the answer is correct" and "the time-based solution information" are determined as the training evaluation elements to predict the "test scores" may be exemplified. At this time, even if the AI model is not trained with the same training data (exam score) through pre-training, the AI model may be pre-trained with relevant data (whether the answer is correct or time-based solution information), so that the educational element (test score) can be predicted.

The fine-tuning unit 220 may be an operation of performing additional training on the pre-trained AI model according to the educational element to predict. The fine-tuning unit 220 may train the AI model having a fixed weight through the pre-training, with respect to additional data, thereby updating the weight.

The additional data may be different depending on the educational element to be predicted. According to an embodiment, the additional data may be data having a higher relevance to the educational element to be predicted compared to the training evaluation element, or may intentionally include data with low relevance to prevent overfitting.

In another embodiment, the additional data may be training data for the educational element to be predicted. In the above example, the AI model may be trained with "whether the answer is correct" and "time-based solution information" in the pre-training stage, and may then be additionally trained only with the "test score" as the additional data in the fine-tuning stage.

The educational element prediction unit 230 may predict the educational element on the basis of the fine-tuned AI model. In the above example, the educational element prediction unit 230 may predict the "test score" on the basis of the AI mode having a fixed weight after being subjected to pre-training and fine-tuning with "whether the answer is correct" and "time-based solution information".

Unlike the probability of correct answers, which can be predicted directly from the question-solving data that AI models can collect, in terms of test scores or grades, there is not enough actual test score data to directly predict the test scores or grades, and even the actual test score data can only be collected in small amounts offline, so there was a problem in that the accuracy was lower compared to the prediction of the probability of correct answer.

According to the pre-training modeling system 50 according to an embodiment of the present disclosure, it is possible to predict an educational element lacking training data with higher accuracy, through the AI model which has been pre-trained and fine-tuned as the relevant evaluation element in the field of education with limited resources.

Figure 3:
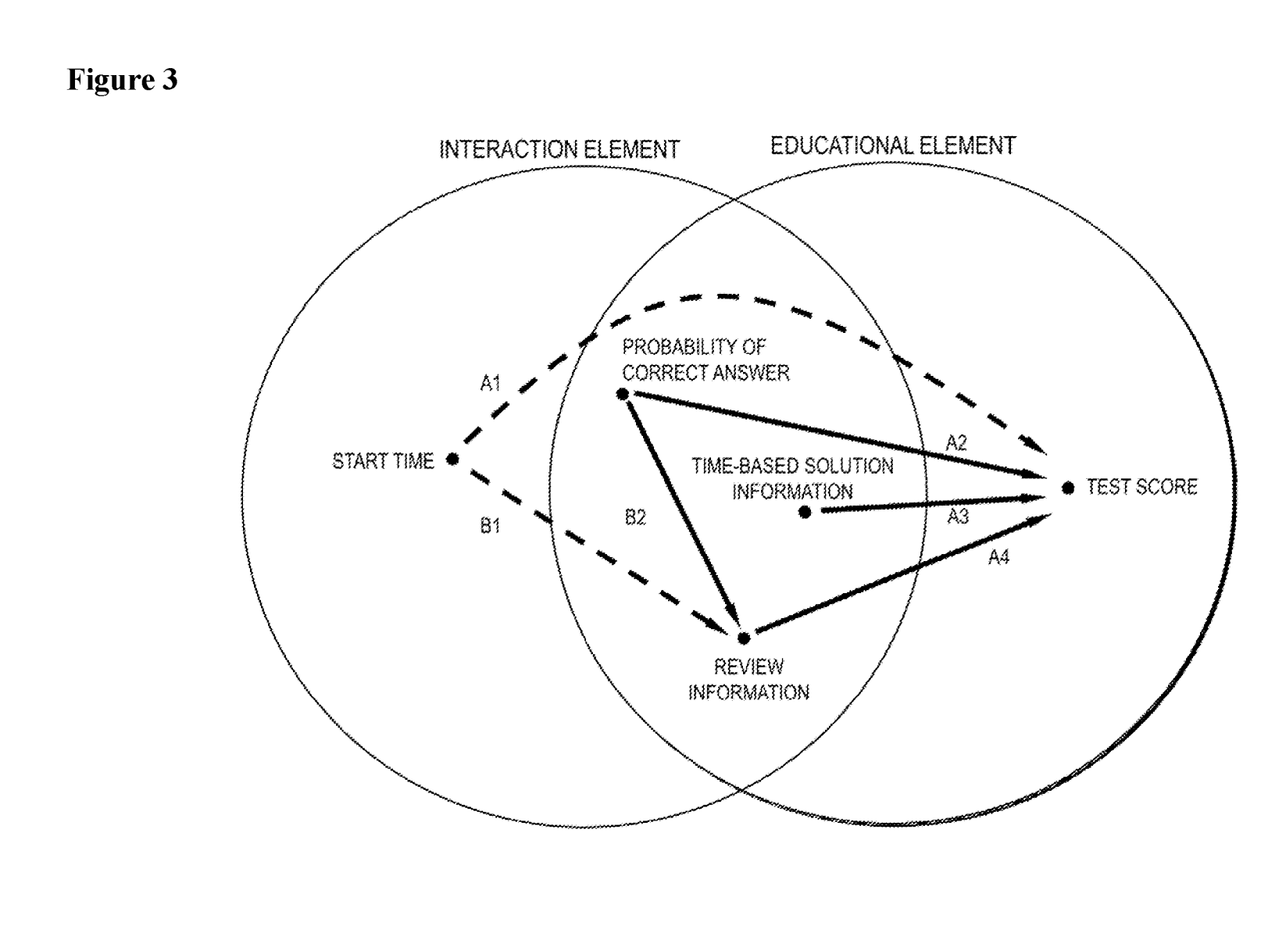
FIG. 3 is a diagram illustrating an operation of predicting an educational element from an interaction element according to an embodiment of the present disclosure.

FIG. 3 is a diagram illustrating an operation of predicting an educational element from an interaction element according to an embodiment of the present disclosure.

Referring to FIG. 3, an example in which test scores A1, A2, A3 and A4 are predicted from an AI model that has been pre-trained with "start time", "correct answer probability", "time-based solution information", and "review information", and "review information" is predicted in B1 and B2 from the AI model which has been pre-trained with the "start time" and "correct answer probability" is shown.

As shown in FIG. 3, the AI model according to an embodiment of the present disclosure may be pre-trained even with an interaction element (start time) rather than the evaluation element, as well as the evaluation elements (correct answer probability, time-based solution information, and review information).

In addition, according to the AI model according to an embodiment of the present disclosure, even an educational element (review information) which is the evaluation element may be predicted in B1 and B2 through the pre-trained AI model, as well as the educational element (test score) rather than the evaluation element.

In addition, according to the AI model according to an embodiment of the present disclosure, the educational element (review information) predicted in B1 and B2 through the pre-trained AI model may be used again as training data of pre-training for predicting another educational element (test score) in B4.

The AI element used for pre-training and the educational element predicted through the pre-trained AI model may be determined regardless of whether the AI element and the educational element belongs to the evaluation element. However, an interaction element that is not the educational element such as "start time" has little relevance to the efficient use of resources in the educational field with limited resources and is unnecessary training data, thereby increasing noise.

Therefore, the pre-training modeling system 50 according to an embodiment of the present disclosure defines an evaluation element as an element that can be used as a tool for pedagogical evaluation among information generated through interaction between a user and an AI model in educational content, and trains the AI model using the defined evaluation element, thereby increasing the accuracy with reduced noise by removing unnecessary training data.

Figure 4:
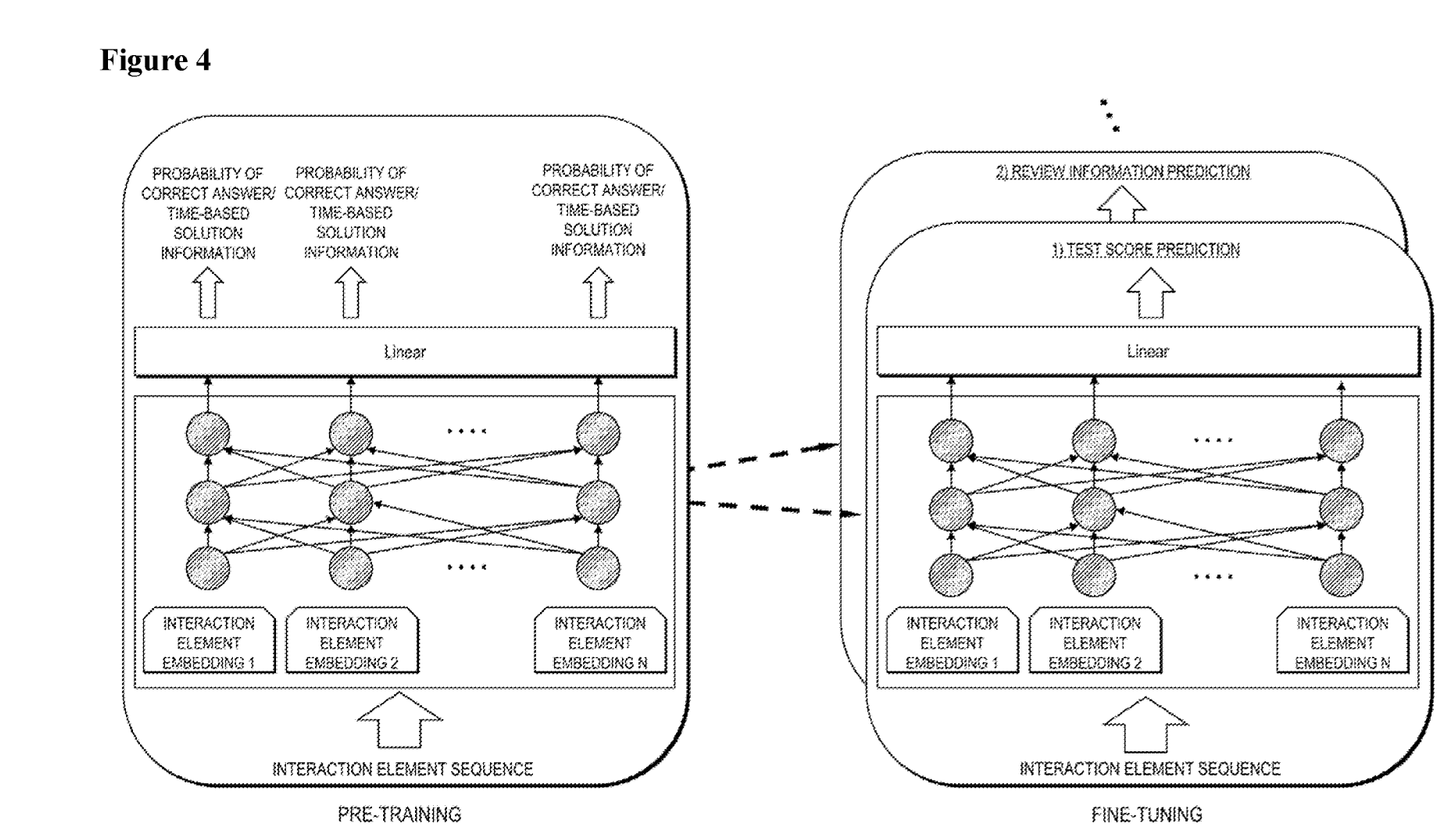
FIG. 4 is a diagram illustrating pre-training and fine-tuning according to an embodiment of the present disclosure.

FIG. 4 is a diagram illustrating pre-training and fine-tuning according to an embodiment of the present disclosure.

Referring to FIG. 4, in a pre-training stage, a plurality of interaction elements may be input as a sequence and embedding may be performed. Embedding may be an operation of composing the meaning of words, sentences, and texts while calculating correlations and expressing them through numerical values, even if the expressions or forms input by the user are different.

The embedding of the interaction elements may be performed N times, and pre-training may be performed while the weights are adjusted according to the prediction results of the educational elements in each layer. Although FIG. 4 shows the probability of correct answers or the time-based solution information as the educational element used for pre-training, pre-training can be performed using various educational elements such as a dropout rate, required time, course completion information, and review information.

The weights determined through pre-training can be used as a basis for fine-tuning. In the fine-tuning stage, the AI model can adjust the weights again through additional training according to the educational element to be predicted.

In the example of FIG. 4, the AI model may be pre-trained with the probability of correct answers and time-based solution information, and may then be fine-tuned to be used as a model for 1) prediction of test scores and 2) prediction of review information.

The pre-trained training evaluation element may be determined as a combination of at least one or more various evaluation elements. In an embodiment, when there are evaluation elements of the probability of correct answers and the time-based solution information, 1) in the case of test score prediction, it had the highest accuracy when pre-training is performed by reflecting both the probability of correct answers and the time-based solution information, 2) in the case of review information prediction, it had the highest accuracy when pre-training is performed by reflecting only the probability of correct answers.

The AI model that has been subjected to pre-training and fine-tuning may have a fixed weight, and may predict the educational element on the basis of the fixed weight.

Figure 5:
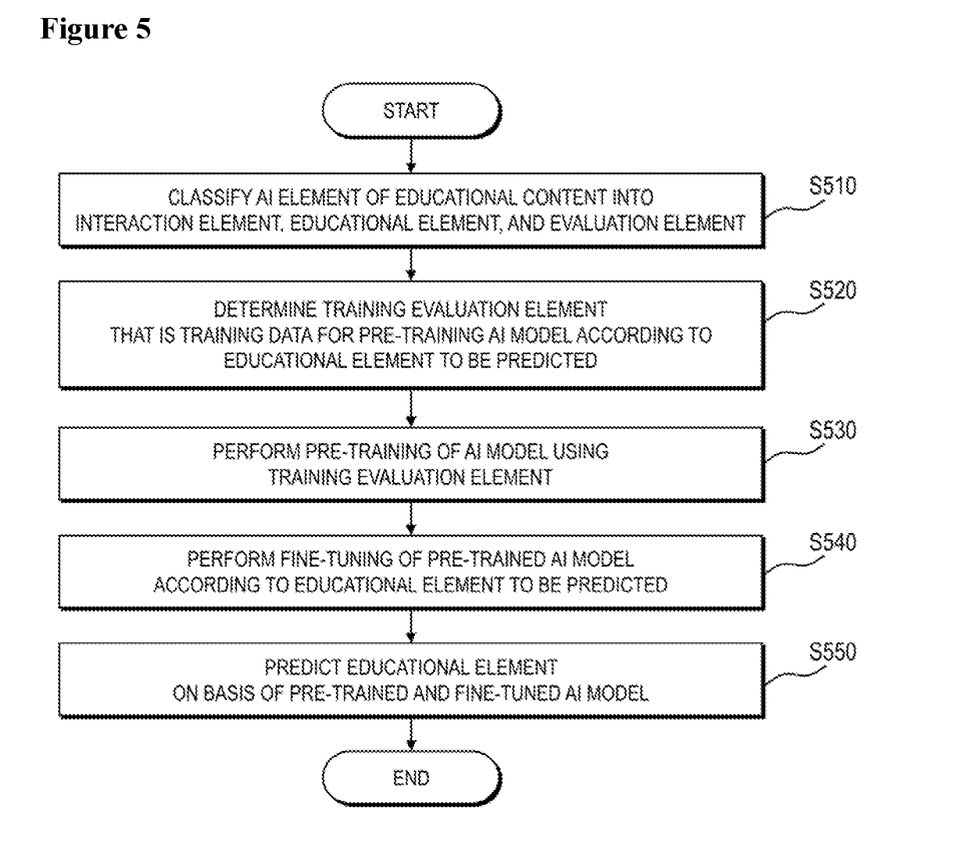
FIG. 5 is a flowchart illustrating a pre-training modeling method according to an embodiment of the present disclosure.

FIG. 5 is a flowchart illustrating a pre-training modeling method according to an embodiment of the present disclosure.

Referring to FIG. 5, in operation S510, an AI element of educational content may be classified into an interaction element, an educational element, and an evaluation element. The classification of each element may be determined differently depending on the type of question (TOEIC, TOEFL, TEPS, SAT, College Scholastic Ability Test, . . . ) or the purpose of AI prediction.

In operation S520, the pre-training modeling system 50 may determine a training evaluation element that is training data for pre-training the AI model according to the educational element to be predicted.

The training evaluation element may be the interactive element rather than the evaluation element, but in this case, unnecessary noise may be increased. Therefore, a method for training an AI according to an embodiment of the present disclosure may determine the training evaluation element among the evaluation elements and may use the determined training evaluation element as training data for pre-training.

The training evaluation element may be determined by a combination of different evaluation elements according to the educational element to be predicted. In an embodiment, in the case of test score prediction, the AI model may be pre-trained with the probability of correct answers and the time-based solution information, and in the case of review information prediction, the AI model may be pre-trained with the probability of correct answers.

In operation S530, the pre-training modeling system 50 may perform pre-training of the AI model as the training evaluation element, and in operation 540, may perform fine-tuning of the pre-trained AI model according to the educational element to be predicted.

The fine-tuning may be an operation of additionally training the pre-trained AI model according to the educational element to be predicted. The fine-tuning may be an operation of training the AI model having a fixed weight through pre-training, with additional data to update the weight.

In operation S540, the pre-training modeling system 50 may predict the educational element on the basis of the pre-trained and fine-tuned AI model.

The embodiments of the present disclosure disclosed in the present specification and drawings are merely provided for specific examples to easily explain the technical content of the present disclosure and help the understanding of the present disclosure, and are not intended to limit the scope of the present disclosure. It will be apparent to those of ordinary skill in the art to which the present disclosure pertains that other modifications based on the technical spirit of the present disclosure can be implemented in addition to the embodiments disclosed herein.

INDUSTRIAL APPLICABILITY

The pre-training modeling system and method for predicting an educational element using a pre-trained AI model as described above can be applied to the online education service field.

The invention claimed is:

1. A pre-training modeling system for predicting an educational element using a pre-trained AI model based on AI elements of educational content,
   wherein the AI elements include a plurality of interaction elements obtained according to an offline user's operation from a user terminal, a plurality of educational elements and a plurality of evaluation elements,
   wherein the plurality of educational elements include information collected during a question solution process,
   wherein the plurality of evaluation elements are elements common between the plurality interaction elements and the plurality of educational elements, and the plurality of evaluation elements include an element that can be automatically collected every time the user solves a question and that can be used as a tool for pedagogical evaluation,
   wherein the pre-training modeling system comprises:
   a pre-training unit configured to pre-train an AI model by (i) receiving the plurality of interaction elements according to the offline user's operation from the user terminal, (ii) determining evaluation elements among the plurality of evaluation elements as training evaluation elements for pre-training the AI model according to an educational element to be predicted among the plurality of educational elements, and (iii) pre-training the AI model using the determined training evaluation elements among the plurality of evaluation elements;
   a fine-tuning unit configured to perform an additional training operation with respect to the pre-trained AI model, according to the educational element to be predicted; and
   an educational element prediction unit configured to predict the educational element, on the basis of the fine-tuned AI model,
   wherein the educational element to be predicted is not an element of the plurality of evaluation elements,
   wherein the plurality of educational elements include one or more pieces of information among test scores, grades, qualifications, and review information indicating whether the user got a correct answer when re-solving the same question, and
   wherein the plurality of educational elements include a number of elements, and each of the number of elements corresponds to information in which the amount of information automatically collected every time the user solves an individual question is small or information that must be separately input from the user because the information cannot be automatically collected.

2. The pre-training modeling system of claim 1, wherein each of the training evaluation elements is determined according to the result of comparing the result of predicting an educational element with an actual value by combining at least one or more of the plurality of evaluation elements.

3. The pre-training modeling system of claim 2, wherein the fine-tuning trains the AI model having a fixed weight through the pre-training with respect to additional data to update the weight, and the additional data is determined differently according to the educational element to be predicted.

4. The pre-training modeling system of claim 1, wherein the educational element to be predicted includes one of test score, grade, qualification, and review information, and the plurality of evaluation elements include one or more of whether the answer is correct, time-based solution information, a dropout rate, a required time, course completion information, and review information.

5. The pre-training modeling system of claim 1, wherein the educational element prediction unit predicts an educational element among the plurality of educational elements that is an evaluation element among the plurality of evaluation elements through the pre-trained AI model, or uses the educational element predicted through the pre-trained AI model as training data of pre-training for predicting other educational elements among the plurality of educational elements again.

6. A pre-training modeling method for predicting an educational element using a pre-trained AI model based on AI elements of educational content,
   wherein the AI elements include a plurality of interaction elements obtained according to an offline user's operation from a user terminal, a plurality of educational elements and a plurality of evaluation elements,
   wherein the plurality of educational elements include information collected during a question solution process,
   wherein the plurality of evaluation elements are elements common between the plurality interaction elements and the plurality of educational elements, and the plurality of evaluation elements include an element that can be automatically collected every time the user solves a question and that can be used as a tool for pedagogical evaluation,
   wherein the pre-training modeling method comprises:
   pre-training an AI model by (i) receiving the plurality of interaction elements according to the offline user's operation from the user terminal, (ii) determining evaluation elements among the plurality of evaluation elements as training evaluation elements for pre-training the AI model according to an educational element to be predicted among the plurality of educational elements, and (iii) pre-training the AI model using the determined training evaluation elements among the plurality of evaluation elements;
   fine-tuning the pre-trained AI model by performing an additional training operation with respect to the pre-trained AI model according to the educational element to be predicted; and
   predicting the educational element on the basis of the fine-tuned AI model,
   wherein the educational element to be predicted is not an element of the plurality of evaluation elements, wherein the plurality of educational elements include one or more pieces of information among test scores, grades, qualifications, and review information indicating whether the user got a correct answer when re-solving the same question, and wherein the plurality of educational elements include a number of elements, and each of the number of elements corresponds to information in which the amount of information automatically collected every time the user solves an individual question is small or information that must be separately input from the user because the information cannot be automatically collected.

* * * * *